Feb. 28, 1950.  B. F. KENYON  2,499,099
TORQUE CONTROLLED LIQUID TORQUE DRIVE

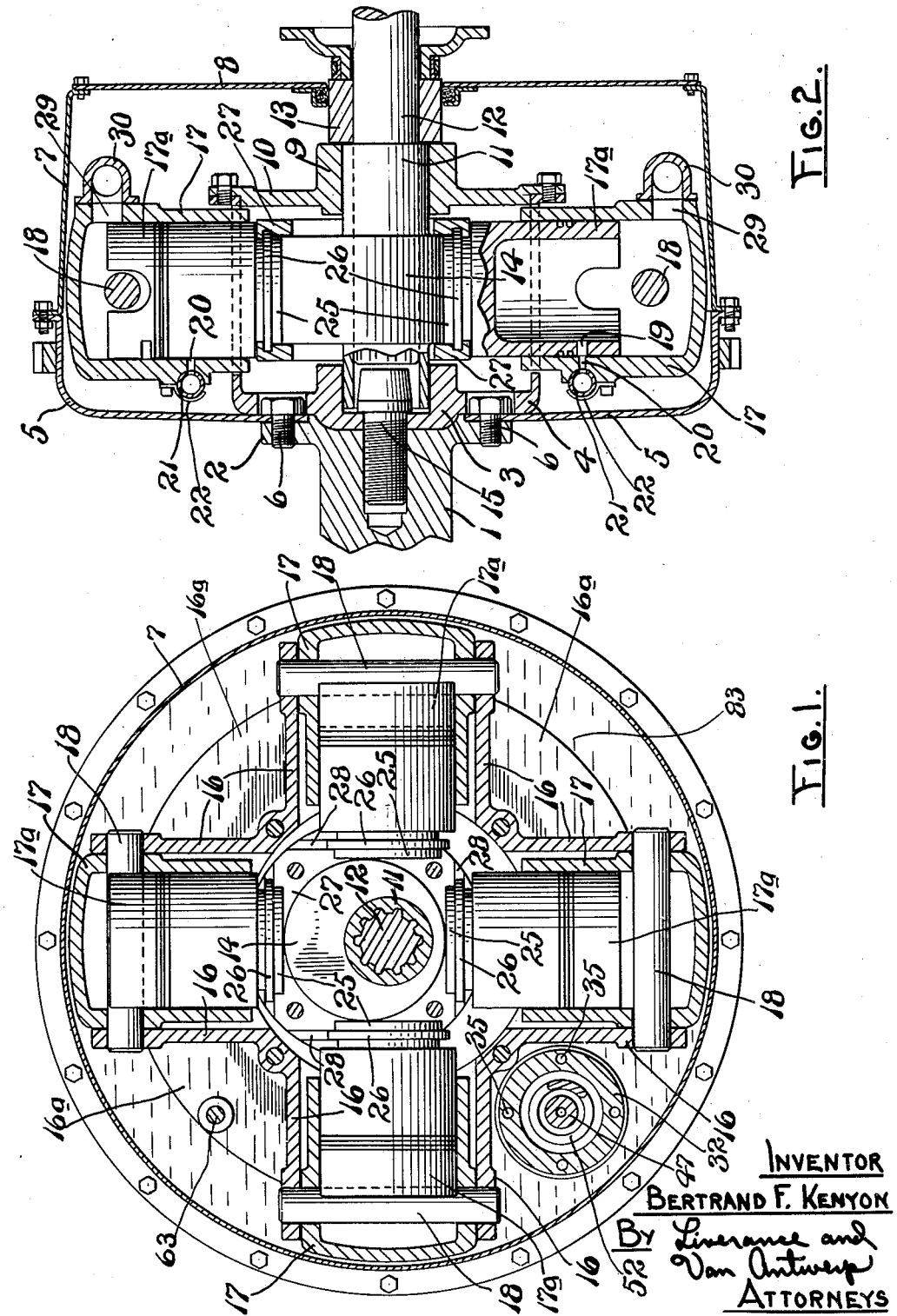

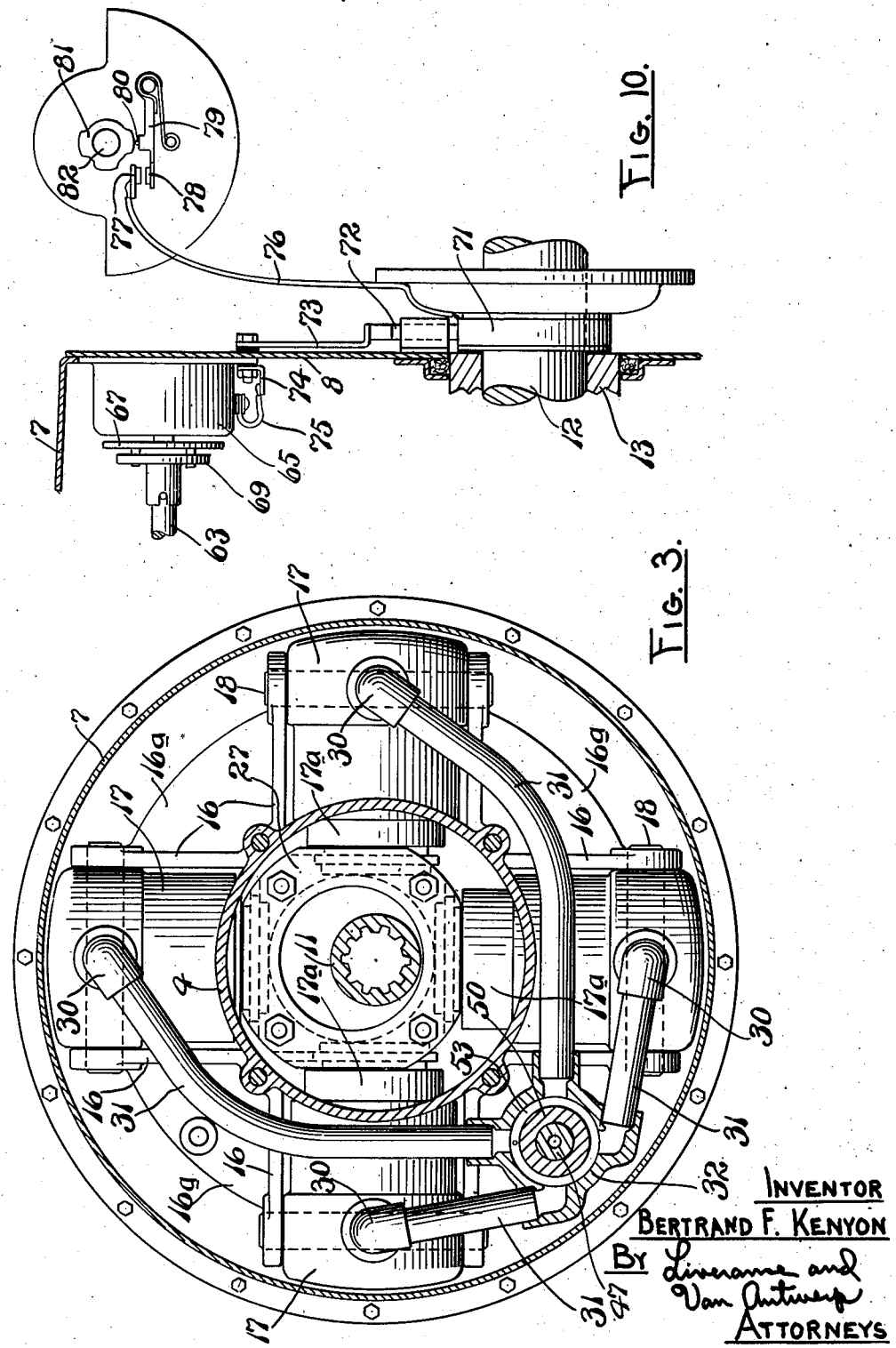

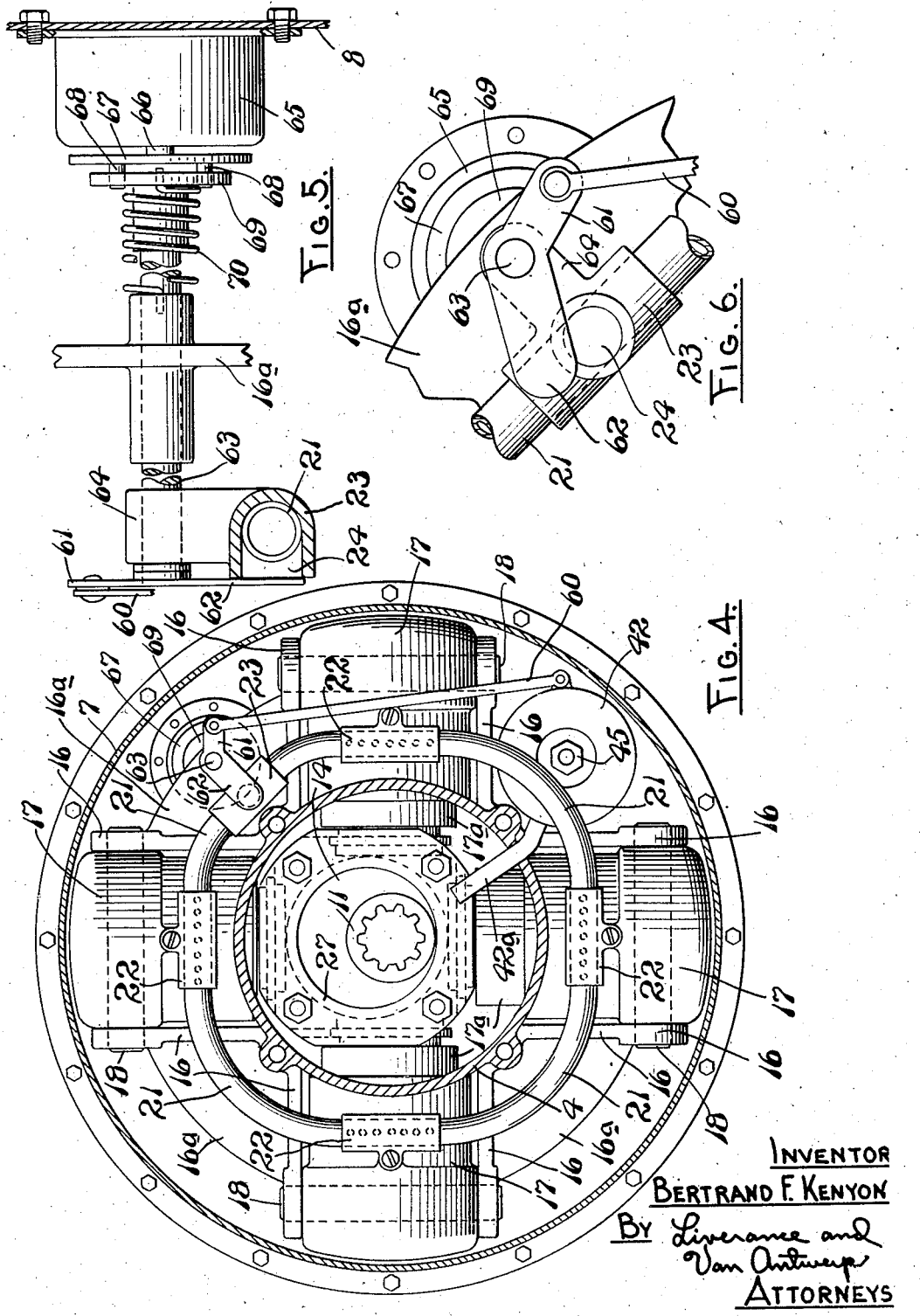

Filed April 29, 1946  4 Sheets-Sheet 4

INVENTOR
BERTRAND F. KENYON
BY Liverance and
Van Antwerp
ATTORNEYS

Patented Feb. 28, 1950

2,499,099

UNITED STATES PATENT OFFICE 2,499,099

TORQUE CONTROLLED LIQUID TORQUE DRIVE

Bertrand F. Kenyon, Grand Rapids, Mich., assignor to Mechano Gear Shift Company, Grand Rapids, Mich., a corporation of Michigan Application April 29, 1946, Serial No. 665,744

7 Claims. (Cl. 192—60)

This invention is concerned with novel and very desirable improvements in the torque controlled liquid torque drive disclosed in my prior application, now Patent No. 2,400,121, issued May 14, 1946. In such application the liquid connection of driving and driven members for driving the latter by the former, controlled by the functioning of a control means is fully disclosed. As long as the control means is in open position, the driving member may continuously operate without affecting the driven member. When said control means is moved toward its closing position, an operative connection of the driving and driven members begins, and with further movement, in effect locks the driving and driven members together at a set time and set torque, and the driving holds through a liquid cushion between the members, and without any metal to metal engagement, and without movement of liquid when said driving and driven members are turning at the same speed.

In the disclosure of my prior application, means are provided whereby the torque of the driving shaft is converted into pressure equal to the load in the driven shaft, thereby maintaining direct drive through the liquid regardless of the speed of rotation or until the torque is released. The liquid is to pass through a controllable restricted course or passage therefor until the increasing resistance to passage of the liquid builds up a pressure therein equal to the load. In such previously shown disclosure there is included a casing containing liquid which, under centrifugal action, when the mechanism is in operation and rotating, provides a liquid ring covering the cylinder ports and within the ring there is a center containing no liquid, but air. The unit, by means of which the driving and driven members are connected, is a rotating unit within which the liquid is carried, which unit acts as a fly wheel. A very small amount of liquid is required so that the size and weight of the fly wheel is limited, there is the development of substantially no heat because the liquid does not circulate when a direct driving connection between the driving and driven members has been attained, and the liquid used is not wasted nor lost, whereby the mechanism in conjunction within which the liquid is used is a self-contained unit.

The control member utilized, hereafter denoted as "by-pass head" which in construction is a combined movable by-pass and compression head, is automatically movable under the pressures generated and is progressively increasingly moved toward its closed position as the pressure is increasingly enlarged as the progressive movement of the by-pass head more and more restricts the liquid circulation. And at the final operative position thereof, the liquid circulation has been substantially stopped, and is wholly stopped except for a minimum required passage for balancing the head, thereupon the liquid stops circulating and the driving and driven members are connected in direct one to one driving ratio. It is desirable in some instances, for example, on an automobile to have the engine run idle, that is the crank shaft of the engine will continually operate at some predetermined low speed, with the shaft usually driven by the engine crank shaft through the intervention of a clutch at rest by reason of the clutch being disconnected. My invention, using the torque liquid drive disclosed as a substitute for the previous disconnecting clutch, the running idle of the engine may be accomplished by a spring pre-load against the movement of the by-pass head, with the proper calibration and size of the passages provided in said by-pass head for liquid passage or circulation. By such construction, the engine may run idle without driving the automobile, but upon accelerating the engine and increasing the speed of the crank shaft, the pressure of the circulation liquid will build up with automatic progressive decreasing of the area of liquid passage in the by-pass head until shoftly, a direct one to one driving ratio between the driving crank shaft and the shaft leading to the sliding gear transmission driven thereby is made.

The connection of the driving and driven members should be capable of release quickly and practically instantly. The present invention has for its primary object and purpose and is directed to the provision of a novel, practical means for such substantially instant release when desired. Many other ancillary objects and purposes to such main object and purpose, together with novel and practical means and mechanism for attaining the same, will appear and be understood from the following description, taken in connection with the accompanying drawings illustrating a preferred embodiment of the invention and of an improved construction of the torque control liquid torque driving structure, in which drawings, Fig. 1 is a vertical section in a plane at right angles to the longitudinal axis of the driving and driven shafts, said section being taken through the liquid torque drive unit.

Fig. 2 is a vertical section in a plane parallel to or substantially coincident with the axis of the driving and driven shafts.

Fig. 3 is a transverse vertical section on a plane parallel to the section shown in Fig. 1 at the back of the direct drive unit and looking in a forward direction.

Fig. 4 is a transverse vertical section through the unit at the front thereof, the interior mechanism of the unit within its casing being shown in front elevation.

Fig. 5 is an elevation of a solenoid controlled mechanism for opening and closing the passage of liquid to the cylinders of the unit.

Fig. 6 is an enlarged elevation showing the opening through which the liquid passes from the liquid ring to said cylinders and the rocking valve which may open or close said opening.

Figure 7:
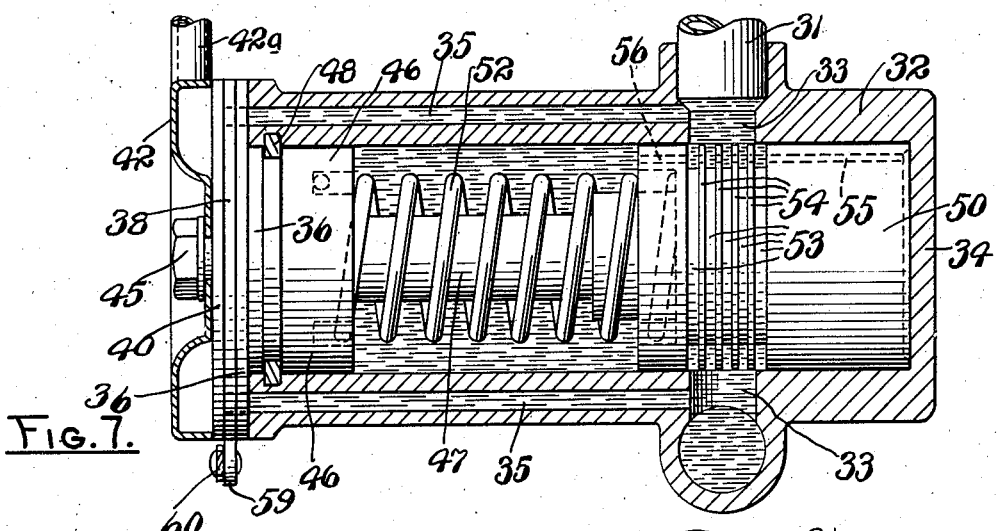
Fig. 7 is an enlarged longitudinal section through it at the housing of the by-pass head, said head being shown therein in side elevation.
Figure 8:
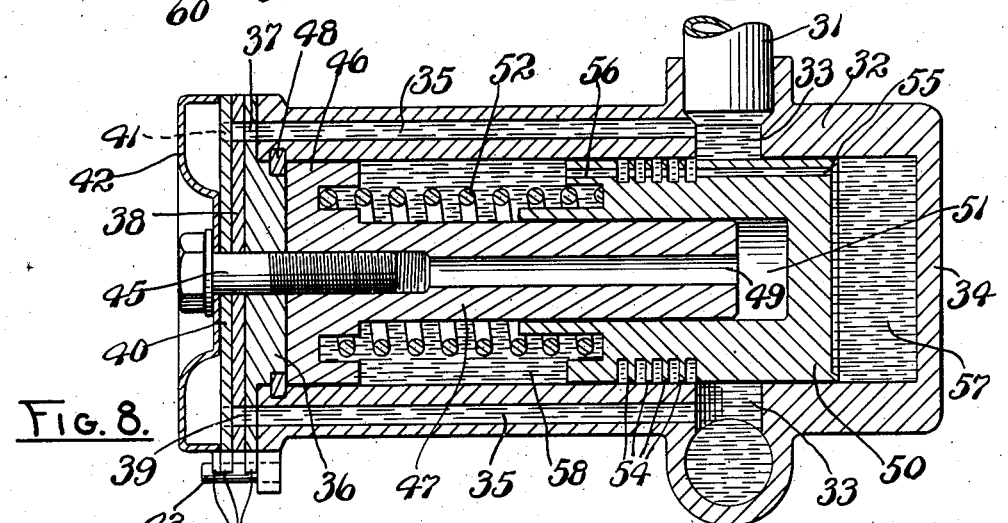
Fig. 8 is a like section, the by-pass head being also shown in longitudinal section.
Figure 9:
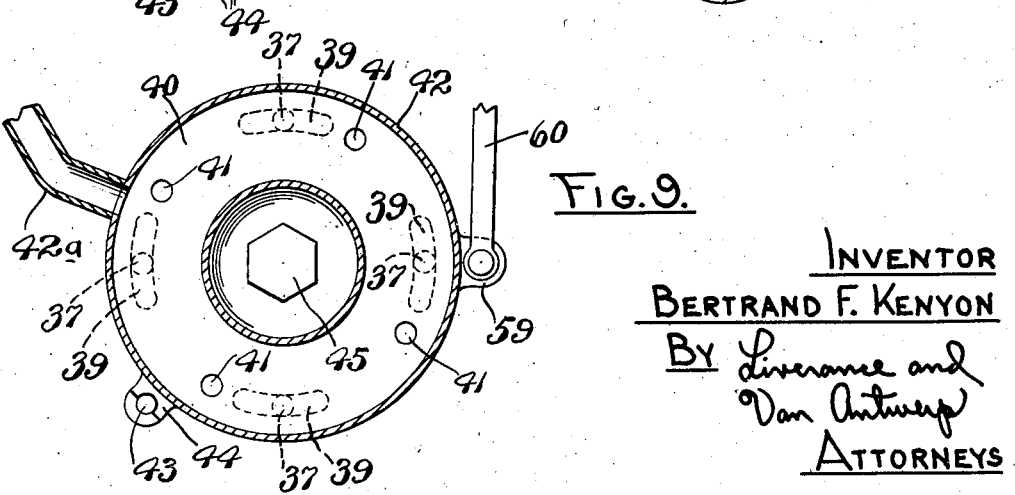

Fig. 9 is a partial transverse vertical section and end elevation looking at the left hand end of Figs. 7 or 8, and Fig. 10 is a somewhat diagrammatic elevation showing a method of operating the quick release of the driving and driven members through the movement of an element of the structure shown in Figs. 7, 8 and 9 to release the liquid under built-up pressure to the atmospheric center of the unit, thereby substantially instantly reducing the operative pressure to which the liquid has been subjected to that of atmospheric pressure, effecting the quick release of the connection of the driving and driven members.

Like reference characters refer to like parts in the different figures of the drawings.

The present disclosure of the invention in question shows an environment for the invention similar in most respects to that shown in my prior application above identified, though with some modifications and improvements in structural detail for economy and betterment of operation. The driving shaft shown at 1 in Fig. 2 may be provided with an annular flange 2 at its end, and a drum member having hub 3 and an annular drum 4 cast integral therewith secured to the flange 2, together with a section 5 of the surrounding housing or casing within which the liquid used is contained. Cap screws 6 are used in securing the drum, the housing section 5 and the flange 2, in permanent relation to each other. The housing is completed by an annular section 7 and a rear side 8 all of the housing sections being of thin metal and secured together in a sealed relation to prevent leakage of the hydraulic liquid which is used.

The drum 4 is closed at its rear end by a closure plate which has a central hub 9 and an annular plate 10 extending therefrom connected by screws to the drum at its open side. The hub 9 is in axial alinement with the hub 3 and a sleeve 11 extends through the hub 9 and into a bearing recess in the hub 3 provided to receive the front end of the sleeve. A driven shaft 12, in axial alinement with the driving shaft 1, passes through a sleeve bearing 13, as shown in Fig. 2, is extended into the sleeve 11 and has a splined connection therewith as shown in Fig. 1. An eccentric 14 integral with or permanently secured to the sleeve 11 is located between the bearing hubs 9 and 3 and a relatively heavy cap screw 15 passes through the center of the hub 3 and screws into the adjacent end of the driving shaft 1.

From the annular portion of drum 4 integral pairs of spaced parallel arms 16 extend radially outward nearly to the annular walls of the housing described, there being four pairs of such arms located at angles of 90° to each other. Between each pair of arms a cylinder 17, closed at its outer end, is located and mounted on a transverse pin 18 extending through the outer portion of each cylinder and mounted at its ends of and near the outer ends of the arms 16, four of said cylinders being provided. Between adjacent angularly disposed arms 16, integral webs 16a are cast for strength and reinforcement. Within each cylinder a piston 17a is reciprocably mounted. The pistons are disposed in two pairs, the pistons being in opposition to each other and axially alined. As shown in Fig. 2 the pistons are interiorly hollowed out and recessed at their outer portions and the walls are slotted at diametrically opposite points from the outer ends inwardly to eliminate interference with the pins 18 upon which the cylinders are mounted for a limited rocking movement.

Each of the pistons 17a at the front side thereof and toward its outer end has a port 19 passing through its wall which in one position of the said pistons comes into conjunction with a plurality of openings 20 made through the wall of its associated cylinder 17. As shown in Fig. 4, a conduit made of a pipe 21 shaped in a generally square outline, or made up of a number of sections of pipe having their ends in conjunction with each other lies against all of the cylinders 17 with openings through the sides of the pipe in conjunction with the openings 20 of the cylinders and held in place by screw attached plates of clips 22 secured to said cylinders. At one portion of the length of the conduit made by the pipe 21, a sleeve 23 is located, which may be utilized to join together the two ends of a single pipe length 21, said sleeve having a lateral opening 24 in its side (Fig. 6) so that communication is made between the interior of the enclosing housing and the conduit 21, whereby liquid contained within the housing may pass through said opening at 24 into the conduit 21 and thence through the openings 20 and through the openings 19 when they are in conjunction with the openings 20 to supply liquid for the chambers between the pistons and the outer ends of the cylinders.

Each of the pistons 17a at its inner end has a projection 25 of cylindrical form and of less diameter than the exterior diameter of the piston, with ribs 26 at right angles to each other around it. A frame rectangular in outline comprised of two spaced apart open frame members 27 securely connected together in spaced relation to each other is disposed one at one side and the other at the opposite side of the projecting portions 25, said frame members 27 having slots 28, four in number, in succession at right angles to each other near their outer edges, in which opposite portions of the annular ribs 26 are received. The eccentric 14 is received in openings in the frames 27 so that as the pistons and cylinders move around the eccentric said pistons are reciprocated, the diametrically opposed pistons, the longitudinal axes of which are substantially coincident, moving simultaneously and equally in opposite directions in their respective cylinders.

Each cylinder 17, near its outer end at its front side, has an outlet port 29 connecting with a coupling or union 30, to which a conducting pipe 31 is permanently secured. The four pipes 31, forming a manifold, are directed to and connected with the outer housing 32 of the by-pass head previously mentioned. Said pipes, as shown in Fig. 3, connect with the interior of said housing so that liquid pumped therethrough will circulate through the housing during such times as the pistons are reciprocated and liquid circulation occurs.

The by-pass head housing 32 is a cylinder having a closed end 34. Ports 33 from the pipes 31 are mesh through the walls of the cylinder, being located nearer the closed end 34 than the other end of the cylinder (Figs. 7 and 8). From said ports 33 a number of longitudinal passages 35 extend lengthwise of the walls of the cylinder to said other end, one of such passages leading from each of the ports 33, therefore, four in all. The open end of the cylinder is closed by a closure plate 36 having a center portion extending into the cylinder and an annular flange bearing against the ends of the walls with openings 37 therethrough alined and in conjunction with the longitudinal passages 35. Outside of the closure member 36, a circular plate 38 is located in which four arcuate slots 39 are cut through it, said slots always being in conjunction with the openings 37 (Fig. 9). Outside of the plate 38, a circular plate 40 is placed with four openings 41 therein positioned so that in one location of the intermediate plate 38, the openings 41 are not in conjunction with the slots 39. But, by moving the intermediate plate 38 about its center, the arc-shaped slots 39 are brought into conjunction with both the openings 37 and 41 to make a direct communication from the passages 35 to the outside.

Over the outer flat plate 40 a sheet metal annular housing 42 is located having a depressed center portion bearing against the center part of the outside plate 40, and with an annular chamber 42 which receives liquid conducted through the passages 35 and the openings 37 and 41, and slots 39. From the chamber 42 an outlet branch 42a (Fig. 4) extends toward the center of the housing or into the portion of the housing in which no oil is located, that is, the atmosphere center of said housing.

The closure member 36 and the outside plate 40 are held against rotation by a pin 43 projecting from the cylinder housing 32, each of said members 36 and 40 being provided with projecting recessed fingers in the recesses of which the pin 43 is located. All of said plates together with the chambered housing 42 having a center screw 45 passing therethrough in threaded connection with a guide member, which at its outer end, has a cylindrical head 46 fitting the interior of the housing 32 and a stem 47 of decreased diameter extending therefrom longitudinally of the cylinder 32. A split ring 48 mounted as shown in Fig. 8 locks the head 46 against outward movement beyond the position shown. The stem 47 has an axial passage 49 through it and the screw 45 is also provided with a communicating axial passage to make a direct communication between the chamber 51 within the by-pass head 50 for free passage of air or liquid inward or outward in the movements of the by-pass head relative to said guiding stem 47 therefor.

The by-pass head 50 is of cylindrical form with an exterior diameter very closely approaching the interior diameter of the housing 32. It is normally moved by a heavy coiled compression spring 52 between it and the head 46 (Fig. 8) so as to come against the closed end 34 of the cylinder 32. When in such position (Fig. 7), a plurality of spaced annular calibrated grooves 53 cut around the exterior of the by-pass head and spaced from each other by intervening narrow ribs 54 are located directly at the liquid inlet ports 33. From the outer grooves 53, calibrated passages 55 and 56 lead to opposite ends of the by-pass head 50, the former communicating with a chamber as shown at 57 in Fig. 8, and conducting liquid to said chamber to move said head to the left against the spring 52, the other passage 56 conducting oil into the chamber 58 which is between the by-pass head and the head 46 of its guide. All of the ribs 54 have transverse passages therethrough in alinement with the passages 55 and 56.

The movable plate 38 is provided with an outwardly extending ear 59 to which an elongated link 60 is pivotally connected at one end (Figs. 4 and 9) and at its other end to the arm 61 of a bell crank lever, the other arm 62 of which is associated with the previously described oil entrance opening 24 to the pipe 21 to either cover or uncover said opening. Such bell crank lever 61 is connected to a rock shaft 63 mounted for rocking movement in a lug 64 integrally cast with a sleeve 23 (Fig. 5). Rock shaft 63 extends through the adjacent web 16a and is operable by means of a solenoid construction housed within a housing 65 mounted upon the rear side 8 of the main unit housing.

Within the housing 65 is a well known type of electric construction which is moved upon energizing a solenoid or magnet to rotate the shaft 66. A disk 67 is secured to the shaft 66 and has pins 68 extending therefrom through a small diameter disk 69 coupled to the shaft 63 (Fig. 10) and rocking said shaft against a torsion spring 70 (Fig. 5) interposed between the disk 69 and the bearing sleeve of web 16a through which shaft 63 passes. Upon such rocking the bell crank lever is moved to carry the arm 62 across the opening 24, closing it, and simultaneously actuating the link 60 to move the plate 38 and thereby bring the openings 41 into conjunction with the arc shaped slots 39 (Fig. 9) for the passage of liquid from the passages 35 into the chambered housing 42 and thence outward through the outlet pipe 42a.

As one of an indefinite number of ways in which electric current may be supplied to the solenoid or magnet within the housing 65, a collar 71 is mounted upon and insulated from the shaft 12 with a brush 72 bearing upon the collar, connected through a wire or other conductor of electricity 73 with a bracket 74, with suitable insulation to prohibit electrical connection with the rear plate 8 of the main housing, and an electric connection 75 between the bracket 74 and the magnet or solenoid within the housing 65. A cable 76 connected at one end within the collar 71 at one end connects at its opposite end with a contact 77. Associated with the contact is another contact 78 mounted on a spring actuated lever 79 which carries a member 80 pressed against a cam 81 mounted on a shaft 82. The cam 81 has successive rises and depressions and when the bearing member 80 is located in a depression between the rises, contacts 78 and 77 are brought together to complete an electric circuit. For example, the circuit wires 76 may be connected with the battery of an automobile to supply the current and the shaft 82 operated by the gear shift lever in a manner such that the contacts 77 and 78 are separated when gears of the automobile transmission are in meshing engagement; and are together during the periods when the gear shift lever is in neutral or is being operated to shift the gears.

The one mechanism referred to and described is not to be considered in any manner limiting the invention to such structural manner of operation. Many other ways may be devised and used to effect the simultaneous closure of the oil passing opening 24 and movement of the plate 38 to relieve oil pressure within the oil circuit and reduce the pressure of the oil or liquid circuit to that of atmospheric pressure.

*Operation.*—the main casing enclosing the unit is supplied with a required quantity of liquid which in practice is oil. Such liquid, upon the rotation of said unit located between the driving and driven shaft and connected therewith, through centrifugal action will form a ring of oil, indicated at 83 in Fig. 1, and the central space within the casing being free of oil and at atmospheric pressure, while the pressure to which the ring 83 of oil is subjected will vary according to the speed of rotation of said unit. When the shaft 1 is driven, for example by an engine or other prime mover, shaft 12 initially is at rest, the pistons 17a rotating about the eccentric 14 are reciprocated as previously described, oil being alternately drawn into the cylinders and expelled therefrom through the outlet pipes 30. At the beginning with the by-pass head as shown in Fig. 7, the oil is circulated through the ports 33 and the annular grooves 53, the grooves permitting a maximum passage of oil which will circulate from one piston to another and back and at an idling speed, that is, a predetermined low rotation of driving shaft 1, and shaft 12 will remain at rest. This substantially closed oil circuit is always maintained with a full supply of oil by reason of the ports 19 and 20 and the pipe 21 communicated therewith, the opening 24 being uncovered.

With increase of speed of rotation and a development of increased pressure and flow of the pumped oil, the grooves 53 cannot pass all of it and oil at high pressure forms through the passage at 55 against the end 34 of the cylinder 32. The entire area at its outer end, of the by-pass head is subjected to said pressure and only part of the area outside of plane 47 being thus subjected, said by-pass head will be moved to compress the spring 52 and progressively decrease the passage for oil supplied by the annular grooves 53, which grooves in the movement of the by-pass head to the left (Figs. 7 and 8) will have the grooves successively cut off from functioning. This causes consequent decrease of passage area for the oil in grooves 53, with a corresponding acceleration in movement of the by-pass head until the final position is reached, wherein only the last groove 53 at the left is partially conected with the ports 33. As such resistance to and progressive stopping of the oil circulation occurs, the pistons bearing with increased pressure upon the eccentric 14 starts the eccentric and the connected shaft 12 rotating, there being a progressive increase in rotation of the shaft 12 with respect to the driving shaft 1 until when the by-pass head reaches the position shown in Fig. 8, the pistons completely cease reciprocating and are, for all effective purposes, the same as securely connected with the eccentric 14 and the driving and driven shafts are turned at the same speed of rotation in a direction one to one ratio, the driven shaft having been brought up to said ratio of rotation to the driving from its initial rest or no rotation.

By operating the atmosphere release mechanism, that is providing a free passage of the oil through the passages 35 by moving the plate 38 to allow the free escape of the oil under pressure from the passages 35, the oil pressure within the manifold pipes 31 and the cylinders and in the chambers 57 and 58 are reduced, whereupon oil from the chamber 57 passes back through the passage 55, because of the pressure of the heavy spring 52, and very quickly the driven shaft 12 is brought to a stop, while the driving shaft 1 continues at whatever speed of rotation has been operating. Of course, the times of connecting and disconnecting the driving and driven shafts are dependent upon the areas of the passages 55 and 56 and are a matter of engineering design. However, the chamber 57 when completely filled with oil, carries but a relatively small quantity thereof which, under the pressure of the spring 52 greatly in excess of atmospheric pressure, causes a very rapid emptying of the chamber and a return of the by-pass head to the position shown in Fig. 7.

From the foregoing disclosure, it is evident that the liquid in the cylinders and in the high pressure oil circuit including the by-pass head construction, and the conducting pipes leading from the cylinders thereto, remains under the pressure exerted by the pistons until the releasing plate 38 is moved to open such pressure circuit to atmosphere pressure only. A piston pressure unit is provided which has a constant liquid pressure due to equalized displacement of the cylinders and the pressure from each cylinder forces liquid into the by-pass chambers and channel passages so that pressure does not occur between the pistons and cylinders alone individually, and also is not against a dead end, but instead there is a circulating liquid mass in liquid ratio.

Whenever it is desired to break the connection between the driving and driven members, it is only necessary to move the control valve plate 38 to thereupon open the ports, passages, chambers and channels in which the liquid under high pressure is contained to atmospheric pressure. This will immediately neutralize the pump pressure on the liquid, allowing the driving member or shaft to rotate freely, but with the driven member not driven thereby. There is a substantially instantaneous disconnection of the driving and driven members, which is a primary object and purpose of the present invention. To reconnect said driving and driven members requires merely a return of the control valve member 38 to its closed position, thereby closing the high pressure liquid circuit, cutting it off from atmospheric pressure, whereupon the pressure in the cylinders and connected passages and chambers may be again very rapidly, in fact almost instantly built up until the necessary driving connection between the driving and driven members is attained to take care of the load which the driven member carries.

The construction described, in general essentials like my prior filed application, plus the improvements herein described provides a unit with which there is little or no difference in the speeds of rotation of the driving and driven members under load. Operation of the pistons is substantially or wholly stopped, and movement of the liquid after the full connection between the driving and driven members has been attained, is either wholly stopped or very limited in extent, thereby insuring against development of heat and rises in temperature, and allowing the use of a liquid of low viscous content.

The atmosphere center within the unit surrounded by a liquid ring eliminates possibilities of leakage in the operation with the driving and driven members, and also allows the atmosphere to partially replace liquid in the high pressure liquid circuit upon full idling; that is, disconnecting the driving and driven members and without danger of air in the high pressure circuit upon reconnecting by operating the control valve member 40 to its closed position.

Little liquid is used in the high pressure circuit and only enough additional within the main casing is required to supply the center ring of centrifugal liquid to effect a complete seal of the high pressure circuit and maintain a correct thickness of liquid in the centrifugal liquid ring to establish a correct radius of the atmosphere center. The cycle of operation is developed without change in proportion of openings, and the mechanism functions so that in the connection of the driving and driven members, the restrictions which cause the pressure and regulate the relative speeds of said members, always operates on the same cycle regardless of the speed of two members. Valves are substantially eliminated. The single valve plate 38 is of simple structure not subject to wear or getting out of order. The closure for the opening 24 is likewise of the same character and could be dispensed with, but it is desirable to eliminate oil movements and circulation within the pipe 21 at the time that the atmosphere connection is made.

The construction illustrated, additionally to the atmosphere connecting mechanism provided, contains improvements in construction in my prior structure resulting in economy of production, greater ease of assembly, a mounting of the cylinders so that they may readily aline themselves with the pistons, and in other ways bettering the construction, while serving all of its purposes and functions equally well. The invention is very practical and efficient. It is defined in the claims appended hereto and is to be considered comprehensive of all structures coming within their scope.

I claim:

1. A rotatable driving member, a rotatable driven member, one of said members having a casing with liquid therein which provides a centrifugal ring of liquid within the casing with an atmosphere center within the liquid ring upon rotation, a plurality of pumping means taking liquid from said liquid ring connected with said casing, means for driving said pumping means on the other rotatable member, means having passages connecting all of the pumping means in which high liquid pressure is produced by pumping operation, a control by-pass head which in open position connects all of said manifold passages, means for operating said by-pass head toward closing position by pressure of liquid to thereby stop the pumping means and connect the driving and driven members, said passages having openings leading to the outside atmosphere, movable means for closing said openings for building up pressure and means for operating said movable means to an open position to reduce the pressure within said manifold passages to atmospheric pressure, whereby the pumping means will operate with a disconnection of the driving and driven members, as specified.

2. A driving member and a driven member mounted for rotation, a casing on one of said members and a plurality of pumping means connected with the casing, means for operating the pumping means on the other of said members, said casing containing a limited quantity of liquid which on rotation of the casing takes, under centrifugal action, the position of a continuous liquid ring at the outer portion of the casing with an atmosphere center within said liquid ring, said pumping means having entrance ports from said liquid ring thereinto, means having passages therethrough connecting all of the pumping means, a movably mounted by-pass head controlling the passage of liquid through said passages permitting free passage from one pumping means to the other when open and progressively restricting said passage as it is moved toward closing position, means for conducting liquid under pressure caused by said pumping means against the by-pass head to move it from open toward closing position, said pressure of the liquid in said passages increasing until said pumping means is stopped and the driving and driven members are connected, said passages having openings leading therefrom to the atmosphere, a movable member located over said passages in one position closing them, said member having openings therein leading to the atmosphere which in another position are in conjunction with the manifold passages, and means for moving said member to open or closing position with respect to said passages to thereby position the mechanism for the building up of pressure in said passages and the plurality of pumping means for releasing said pressure to atmospheric pressure in which said pumping means are again rendered operable and disconnection of the driving and driven members takes place.

3. A rotatable driving member, a rotatable driven member, one carrying liquid and a plurality of means for pumping the same, and the other operating means for actuating the pumping means, means connecting said pumping means together for liquid passage from one to the other, means for feeding liquid to the pumping means from the liquid carried by said liquid carrying member, a by-pass head across said connection means in open position permitting such passage and in closed position closing said passage with a progressive reduction in liquid passage as the by-pass head is moved toward closed position, means for carrying liquid under pressure against said by-pass head to automatically move it toward closing position and increase liquid pressure in the pumping means whereupon the pumping means are progressively slowed in operation until the driven member is driven, said connecting means for the liquid passage having openings thereto leading to the atmosphere, movable means closing said openings and means for moving said movable means to open said connecting means to the atmosphere, for the purposes specified.

4. A rotatable driving member, a rotatable driven member, a casing having a chamber therein connected to and rotatable with one of said members, a plurality of pumping units located within said chamber, means connected with the other of said rotatable members for operating the pumping units, said chamber having a body of freely movable liquid therein whereby on rotation of the casing a liquid ring is developed submerging the outer portions of the pumping units, said liquid ring surrounding a center of air, said pumping units having entrance ports for liquid from said liquid ring, means within the casing providing a plurality of pressure passages connecting the pumping units, a by-pass head controlling communication from each pressure passage with other pressure passages, means for operating said by-pass head in response to variations of liquid pressure within said pressure passages and movable means for opening and closing said pressure passages to the air center during rotation of said casing.

5. A rotatable driving member, a rotatable driven member, a casing connected with one of said members having a chamber therein, a plurality of pumping units located in said chamber, means connected with the other of said rotatable members for operating the pumping units, said chamber having a body of freely movable liquid therein whereby on rotation of the casing the liquid takes the form of a ring submerging the outer portions of the pumping units, said outer portions of the pumping units having ports for passage of liquid from the liquid ring to the pumping units or vice versa, means within the casing connected with the pumping units having passages for liquid pumped thereby, said passages being connected and each passage having a vent port leading to atmosphere at normal pressure, a movably mounted member for closing or opening said ports, means for operating said member to port opening or port closing position, a by-pass head controlling communication of the passages with each other, and means for operating said by-pass head in response to variations of fluid pressure within said pressure passages.

6. A rotatable driving member, a rotatable driven member, a casing connected with the driving member having liquid therein which provides a centrifugal ring of liquid in the casing and an atmosphere center within the liquid ring upon rotation, a plurality of cylinders within said casing movable therewith having communication with said liquid ring, pistons within said cylinders, means connected to the driven member for reciprocating said pistons, upon rotation of the driving member, means having liquid carrying channels connecting all of the cylinders in which high pressure is produced by piston reciprocation, a movable by-pass head operable by pressure of liquid supplied by the pumping means toward closing position until the pressure balances the load carried by the driven member and stops piston operation, the driving and driven members thereby being connected together, said by-pass head having an enclosing housing with passages therein leading to said channels and a member movably mounted on said housing having passages connected with the atmosphere centre which, when in conjunction with the first mentioned passages, reduces the pressure in said manifold passages to atmospheric pressure and when moved to another position closes said passages to the atmosphere for the building up of liquid pressure, as specified.

7. A rotatable driving member, a rotatable driven member located in alinement therewith, liquid means for connecting said members including a hollow container for holding liquid surrounding and connected with the driving member to rotate therewith, a plurality of pumping units connected and movable with said driving member, means on said driven member associated with said pumping units for actuating them on rotation of the driving member, means connecting the pumping units for the passage of liquid pumped from one to another, liquid actuated means automatically moved on rotation of the driving member beyond a predetermined speed of rotation for progressively obstructing said passage of liquid to build up pressure in the pumping units and the connecting means therefor until the pressure balances the load required to be overcome on the driven member, and operator controlled means for releasing at will said pressure in said pumping units and the connecting means therefor to disconnect the driving and driven members at all speeds of rotation of said driving member.

BERTRAND F. KENYON.

REFERENCES CITED

The following references are of record in the file of this patent:

UNITED STATES PATENTS

| Number | Name | Date |
|---|---|---|
| 1,406,292 | Sides | Feb. 14, 1922 |
| 1,645,565 | Wingquist | Oct. 18, 1927 |
| 2,025,472 | Perry, Jr. | Dec. 24, 1935 |
| 2,187,552 | Ashburn et al. | Jan. 16, 1940 |
| 2,329,594 | Corrigan | Sept. 14, 1943 |
| 2,400,121 | Kenyon | May 14, 1946 |